United States Patent [19]

Ramiréz et al.

[11] Patent Number: 4,603,357
[45] Date of Patent: Jul. 29, 1986

[54] MAGNETIC RECORDING DETECTION POINTER THAT MEASURES THE TIME PER DATA CELL DURING WHICH THE ANALOG WAVEFORM EXCEEDS A PREDETERMINED DETECTION THRESHOLD

[75] Inventors: Alberto M. Ramiréz; Thomas G. Van Vessem; Christopher W. Zell, all of Tucson, Ariz.

[73] Assignee: International Business Machines Corp., Armonk, N.Y.

[21] Appl. No.: 729,713

[22] Filed: May 2, 1985

Related U.S. Application Data

[63] Continuation of Ser. No. 6,445,874, Dec. 1, 1982, abandoned.

[51] Int. Cl.[4] ............................ G11B 5/02; G11B 5/09
[52] U.S. Cl. ........................................ 360/46; 360/53; 307/234
[58] Field of Search ............... 360/46, 67, 53, 40; 328/117; 307/234

[56] References Cited

U.S. PATENT DOCUMENTS

| | | | |
|---|---|---|---|
| 3,031,646 | 4/1962 | Reinholtz | 360/53 |
| 3,581,297 | 5/1971 | Behr | 360/40 |
| 3,906,379 | 9/1975 | Tuhro | 307/234 |
| 4,081,756 | 3/1978 | Price et al. | 328/117 |
| 4,298,898 | 11/1981 | Cardot | 360/67 |
| 4,346,411 | 8/1982 | Buhler et al. | 360/46 |
| 4,346,412 | 8/1982 | Conley | 360/46 |
| 4,417,213 | 11/1983 | Ito | 307/269 |
| 4,495,529 | 1/1985 | Gustafson | 360/67 X |

OTHER PUBLICATIONS

*Electronics* 4/19/65 One Discriminator Senses Pulse Width and Height by K. G. Ferrie, pp. 90–92.

*Primary Examiner*—Raymond F. Cardillo
*Assistant Examiner*—Alyssa H. Bowler
*Attorney, Agent, or Firm*—J. M. Thomson

[57] ABSTRACT

In a system for detecting information stored upon a flexible magnetic media that includes a magnetic transducer for producing an analog signal representing stored binary data, comparator means for detecting positive and negative peaks of the analog signal, and voltage threshold means for providing a reference threshold voltage to the comparator which is a precise percentage of the voltage peaks of the analog signal, an improved magnetic recording detection pointer comprising a pulse width discriminator used to monitor the time per peak during which the analog signal exceeds the detection threshold as an indication of marginal data which can be used in conjunction with an error correction system to extend the overall system correction capability.

5 Claims, 2 Drawing Figures

MAGNETIC RECORDING DETECTION POINTER THAT MEASURES THE TIME PER DATA CELL DURING WHICH THE ANALOG WAVEFORM EXCEEDS A PREDETERMINED DETECTION THRESHOLD

This is a continuation of application Ser. No. 06/445,874, filed Dec. 1, 1982, now abandoned.

FIELD OF THE INVENTION

The invention concerns an improved magnetic recording detection pointer for use in a system for detecting binary information stored upon a flexible magnetic media. More particularly, the invention concerns a recording detection pointer especially adapted for utilization in a system that includes comparative means for detecting positive and negative peaks of an analog signal read from the flexible media, and voltage threshold means for providing a reference threshold voltage to the comparators which is a precise percentage of the voltage peaks of the analog signal.

BACKGROUND OF THE INVENTION

Detecting signals from flexible media such as flexible disk files and magnetic tape presents unique detection requirements since in such systems the head is generally not in contact with the recording medium and data is stored in run length limited codes where a bandwidth limited version of the derivative of the write wave form is provided upon reading. In that environment, the detection of the readback system must be amplitude sensitive since the raw data provided by the magnetic transducer has discrete positive, zero and negative levels.

Moreover, since magnetic coatings upon flexible media are more susceptible to dropouts than rigid media, relatively large variations of signal amplitude are encountered. Additional problems are encountered since data recorded in a run length limited code usually includes overwriting of data on the track being detected. This introduces noise signals which the detector must be able to discriminate.

These problems have been overcome in a system described in U.S. Pat. No. 4,346,411 titled Amplitude Sensitive Three-Level Detector for Derivative Readback Channel of Magnetic Storage Device. The aforementioned patent describes a system which provides improved detection capability with respect to signals stored upon flexible magnetic media. The patented system generally includes a magnetic transducer for providing an analog signal that represents stored binary data, comparator means for detecting positive and negative peaks of the analog signal, and voltage threshold means for providing a reference threshold voltage to the comparators which is a precise percentage of the voltage peaks of the analog signal.

It has been found that in such a system, a need still exists for providing a magnetic recording detection pointer that gives a reliable indication of marginal detection environments in which a high probability of detection error exists. This need especially exists in high data rate channel processing utilizing a high density analog sampling detector such as that described in the aforementioned patent.

The use of magnetic recording detection pointers in conjunction with magnetic recording channels is known. Thus, error correction is typically used in conjunction with data detection systems to provide enhanced data reliability. Typically, in a multitrack environment, the correction capability of an implemented error correction algorithm will exceed the detection capability of the system. This means that beyond some maximum number of tracks in error in the system, the error correction algorithm cannot by itself correctly identify additional error locations. Consequently, other indicators of likely error occurrence, i.e. pointers, are used to extend the system's capability.

Pointers historically used with analog sampling detection systems employed in conjunction with magnetic recording schemes have typically been of two types, i.e. amplitude pointers and phase pointers.

An amplitude pointer generally provides a means of determining when the envelope in the analog wave form has decreased below a minimum fixed level that represents a valid data transition or pulse. A phase pointer generally is utilized to indicate that a shift in signal phase has occurred within a given data cell or envelope beyond a fixed maximum interval. This implies a false data signal or imminent detection failure.

It has been recognized that the use of either amplitude or phase detection pointers in conjunction with a system such as that described in the aforementioned U.S. Pat. No. 4,346,411 would be ineffective. Thus, the patented system describes a technique for detecting positive and negative peaks that represent data using comparator means and voltage threshold means that provide to the comparator a reference threshold voltage which is a precise percentage of the voltage peaks of the analog signal. The existence of a valid peak is taken to be a signal that has an amplitude in excess of the variable threshold at a point which is taken to be the center of the pulse based upon a clocking signal derived from the peak of the differential signal. With this type of detection scheme, neither an amplitude pointer nor a phase pointer would provide reliable information beyond that already available from the detection circuit. Accordingly, a need exists for a new type of detection pointer which can be utilized in conjunction with the patented system for providing more reliable overall performance.

SUMMARY OF THE INVENTION

It is an object of the invention to provide a magnetic recording detection pointer which meets the aforementioned need for a pointer useful in conjunction with a detection system that derives clock pulses from the data peaks and uses the clock pulses to accurately sample data signals derived by comparing the analog signal to an accurate threshold reference signal in order to determine positive and negative transitions. This and other objects are attained in a system which utilizes a pulse width discriminator to monitor the time per data cell during which the analog input wave form exceeds the detection threshold. This is accomplished by utilizing logic adapted to receive the detected positive and negative peaks of the analog signal and provide a positive output when either peak is present. The output of the logic means is utilized to initiate charging of the capacitor from a current source dufing the duration of a valid positive or negative peak. The level of charge on a capacitor serves as one input to a differential amplifier comparator circuit that receives the variable threshold voltage as its other input. Thus, the differential amplifier comparator provides an output when the capacitor has charged to a certain level indicating that the signal time above threshold is greater than a preset minimum interval.

It should be recognized that the comparator threshold voltage is dynamic since one component is the variable threshold signal. The output of the comparator is latched in a flip-flop which is reset by the data clock pulse signal derived from the data pulse train. The effect of the circuit is to provide pulse width discrimination means to monitor the time per data cell during which the analog input wave form exceeds the detection threshold and to use this indication as a true measure of detection performance. The cooperation of the elements described to provide a pulse width pointer is advantageous in that it produces a marginal data signal that positively occurs in close bit proximity to the actual error. The output of the pointer circuit is then available for use, in well known fashion, in conjunction with error correction circuitry algorithms to extend the detection system's overall capability.

BRIEF DESCRIPTION OF THE DRAWINGS

The foregoing objects and other features and advantages of the invention will become apparent from the following detailed description of the invention taken in conjunction with the accompanying drawings in which.

DETAILED DESCRIPTION OF THE INVENTION

Figure 1:
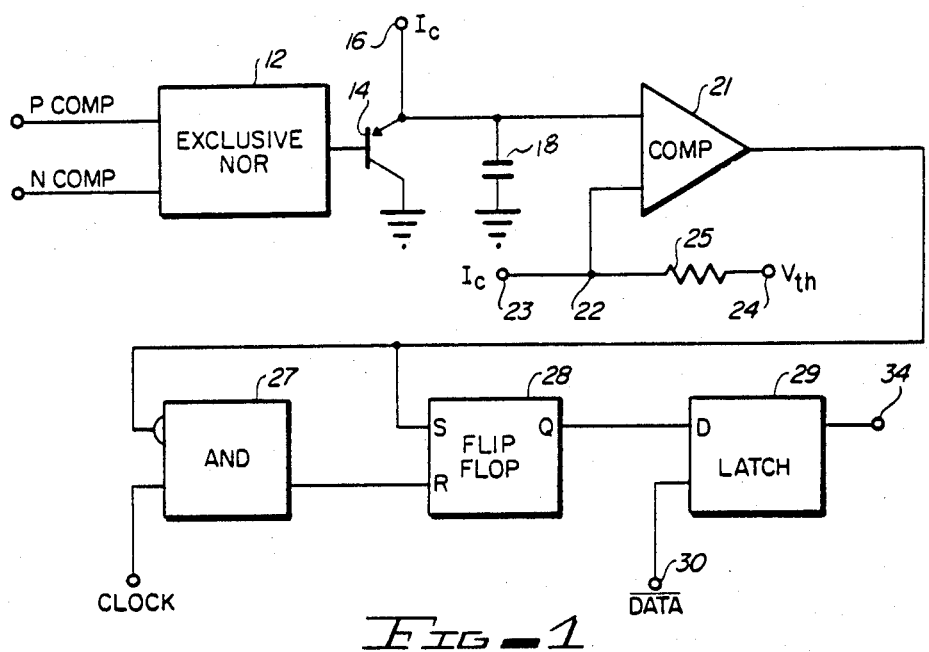
FIG. 1 is a schematic block diagram of a system for providing pointer information in conjunction with a high data rate, high density analog sampling detection system.

Referring now to the drawings and particularly to FIG. 1, a magnetic recording detection pointer circuit is illustrated. The preferred embodiment illustrated in FIG. 1 is particularly suited to be utilized in conjunction with a system such as that described in U.S. Pat. No. 4,346,411. As such, the preferred embodiment utilizes certain input signals which are available from a system similar to that described in the aforementioned patent. In particular, several signals generated within the data detection system of the patent are used as inputs to the pointer circuitry. It should be recognized, however, that other equivalent inputs from other detection schemes based upon the same principles would serve as well. A threshold voltage signal $V_{TH}$ is utilized which comprises a tracking threshold signal designed to represent a voltage reference that remains a fixed percentage of the analog signal amplitude during normal operation of the detection circuit and throughout a dropout. This voltage reference is also applied in the aforementioned patent to the data comparator inputs and utilized in conjunction with peak detection. A P COMP signal is provided which represents the output of the positive data comparator of the detection scheme, indicating that the analog data amplitude has exceeded the tracking threshold voltage in the positive direction. An N COMP signal is also provided, representing the output of the negative data comparator and indicating that the analog data amplitude has exceeded the tracking threshold voltage in the negative direction. A DATA signal is also provided. This represents that if either P COMP or N COMP signal output is valid, concurrent with the derivative of the analog data signal changing polarity, a fixed width pulse is created on an alternating polarity basis, i.e. once a positive peak is detected, the next valid transition must be negative. The rising edge of this data signal is taken as coincident with the peak of the analog data. Finally, a clock signal is provided which represents a variable frequency clock locked in phase to the data pulse train. Thus, this signal represents data speed.

Referring to FIG. 1, an exclusive NOR circuit 12 is illustrated. Circuit 12 has dual inputs receiving, respectively, the P COMP and N COMP signals described hereinbefore. The exclusive NOR circuit provides an output signal that is connected to the base of a normally conducting transistor 14. The emitter of transistor 14 is connected to a constant current source provided at terminal 16 and the collector of the transistor is connected to ground. The emitter of transistor 14 is also connected to one terminal of a capacitor 18 having its other terminal connected to ground. The common emitter capacitor connection is connected to one input terminal of a comparator 21 and the other input of the comparator is connected to a node 22. Node 22 receives a constant current input via terminal 23 and a variable threshold voltage input via a terminal 24 and resistor 25. Comparator 21 provides a signal to inverted AND gate 27 and flip-flop 28. AND gate 27 also receives a clock input and provides an output signal that acts as a reset to flip-flop 28. The set signal to flip-flop 28 is the output of comparator 21.

The Q output of flip-flop 28 is provided as one input to a latch 29 that receives another input comprising the DATA pulse via terminal 30. The output of latch 29 on terminal 34 comprises the pointer signal on terminal 34.

In operation, the circuit described functions as a pulse width discriminator which monitors the time per data cell during which the analog input voltage wave form exceeds the detection threshold and uses this as an indication of the validity of a given detected pulse. The exclusive NOR circuit provides an input as shown on line A of FIG. 2. The exclusive NOR circuit provides a positive input biasing transistor 14 into conduction when neither the P COMP or the N COMP signal is present. However, upon occurrence of either a P COMP or an N COMP signal, the exclusive NOR circuit provides an output that biases transistor 14 into cutoff and capacitor 18 begins to charge via the constant current applied to terminal 16.

The building charge on capacitor 18 is compared to a threshold level determined at node 22 by the constant current source as well as the variable threshold voltage applied across resistor 25. When the charge on capacitor 18 exceeds the signal level at node 22, comparator 21 produces a high output. Thus, the voltage on capacitor 18 is illustrated on line C of FIG. 2. The threshold voltage at node 22 is illustrated on line B and the comparator output is illusrated on line D.

It should be understood that during the period where the signal input to the comparator is less than the detection threshold the capacitor is shorted to ground and the comparator output is zero. However, when the signal amplitude reaches the threshold, transistor 14 is turned off and capacitor 18 charges at a rate determined by the current source. Consequently, when the voltage on capacitor 18 reaches the reference threshold level of the comparator, the comparator output changes from zero to a positive output. Assuming that the voltage threshold remains relatively constant, then the time for the capacitor to charge to the level of the input and provide a positive transition of amplifier 21 output is determined by the value of $R_{25}$, the value of the threshold voltage and the value of $I_c$. This value can be varied experimentally and correlated to a point of desired failure detection.

Figure 2:
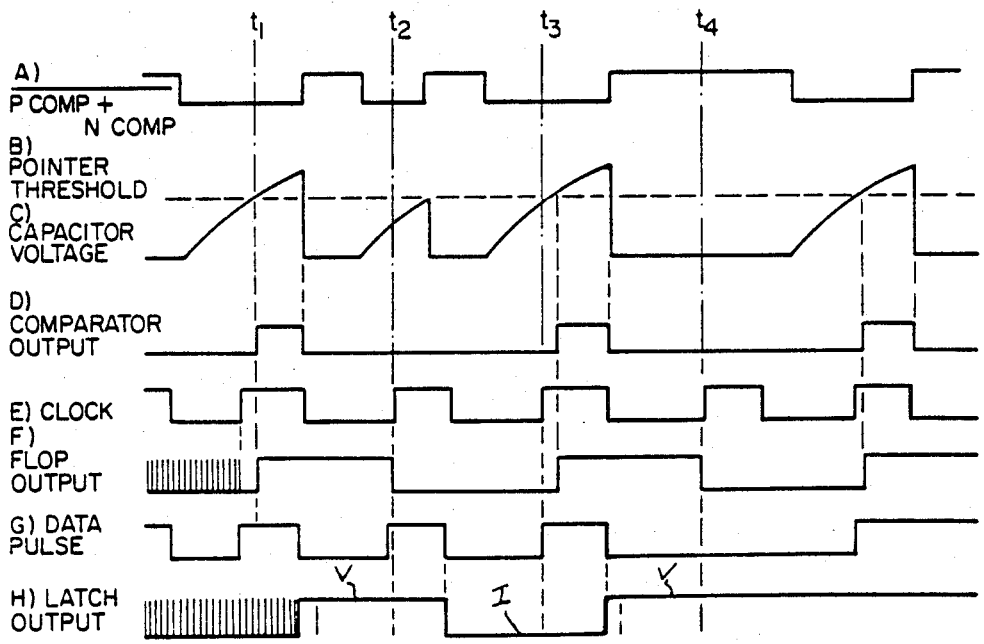
FIG. 2 illustrates certain wave forms helpful in understanding the operation of FIG. 1.

As illustrated in FIG. 2, the clock signal for gate 27 periodically occurs and resets flip-flop 28 upon each occurrence. If flip-flop 28 is reset, the occurrence of an output from comparator 21 will cause flip-flop 28 to be set and upon the next occurrence of a clock signal, the flip-flop will be reset causing a positive output on the flip-flop output as illustrated on line F of FIG. 2. The reset input to flip-flop 28 is disabled during the positive comparator output state by the inverted input of gate 27. A positive output from flip-flop 28 will gate latch 29 and upon the occurrence of a valid data pulse that output will be transferred to terminal 34.

Thus, it should be apparent that the occurrence of a positive comparator output signal at time. T1 in the presence of a positive clock signal will result in the setting of the flip-flop output to a positive state. The occurrence of the next $\overline{DATA}$ pulse on line G will cause the output of latch 29 to go high indicating a valid pointer signal illustrated by letter V. On the other hand the absence of a positive comparator output signal at time T2, coincident with the occurrence of the leading edge of a clock signal will result in the output of flip-flop F being in a low state. Consequently, the occurrence of a $\overline{DATA}$ pulse results in the existence of an invalid signal at the latch 29 output as indicated by letter I. Another valid signal is precipitated at time T3 by the existence of a positive amplifier output signal on line D, a valid clock signal and a $\overline{DATA}$ pulse occurring on line G.

A zero data condition is indicated at time T4 on line C of FIG. 2. This is a valid condition. Under such circumstances, no change occurs in the output of latch 29, as illustrated on line H. This means that no change occurs in the previous correction status, i.e. if the pointer output was indicating a marginal data condition that indication is continued during the zero data condition. It should be apparent that the parameters of the circuit can be varied to determine the precise interval by which the data pulse amplitude must exceed the threshold voltage value to determine a valid data signal. This can be determined experimentally and matched to the requirements of a particular recording system.

The aforementioned pointer is valuable in connection with error correction code algorithms to provide signal correction capabilities beyond that attained with error correction code procedures alone.

We claim:

1. In a system for reading information stored upon flexible magnetic media that includes a magnetic transducer for providing a differential analog signal representing binary data stored upon the flexible media; first and second threshold comparators for detecting positive and negative peaks of the differential analog signal, respectively; a voltage threshold generator for providing a reference voltage to the comparators which is a precise percentage of the voltage peaks of the differential analog signal; and pulse width detection means for determining the amplitude relationship of the differential analog signal to the reference voltage signal, the improvement including;

pointer detection means for monitoring the time during which the positive and negative signal peaks exceed the threshold voltage as an indication of marginal signal quality, wherein said pointer detection means includes logic means receiving detected positive and negative peaks of the differential analog signal and providing an output when either peak is present, and discriminator means responsive to the logic means output for providing an output signal when the positive or negative signal peak exceeds the threshold voltage for at least a present minimum time as an indication of valid data.

2. The system of claim 1 wherein said discriminator means includes a transistor responsive to said logic means to control the charging of a capacitor from a constant current source, an amplifier adapted to receive as one input the charge stored upon the capacitor and as another input a signal proportional to the variable threshold voltage to which a constant voltage has been added for providing an output when the capacitor charge exceeds the signal proportional the variable threshold voltage.

3. The system of claim 2 wherein said logic means comprises an exclusive NOR circuit adapted to receive dual input signals comprising the outputs of the positive and negative comparators used to detect positive and negative peaks of the analog signal.

4. The system of claim 1 further including, latch means responsive to the output of said logic means and responsive to a system clock signal whereby the occurrence of either a valid positive or negative peak concurrent with a change in polarity in the derivative of the analog signal will produce an output which indicates valid signal quality; and whereby an absence of valid peak condition, concurrent with a change in polarity in the derivative of the analog signal produces an indication of a marginal data condition.

5. The system of claim 1 further including means for combining a constant signal input with the variable threshold signal from the voltage threshold generator to provide a dynamically changing input signal to said pulse width discriminator means.

* * * * *